UNITED STATES PATENT OFFICE.

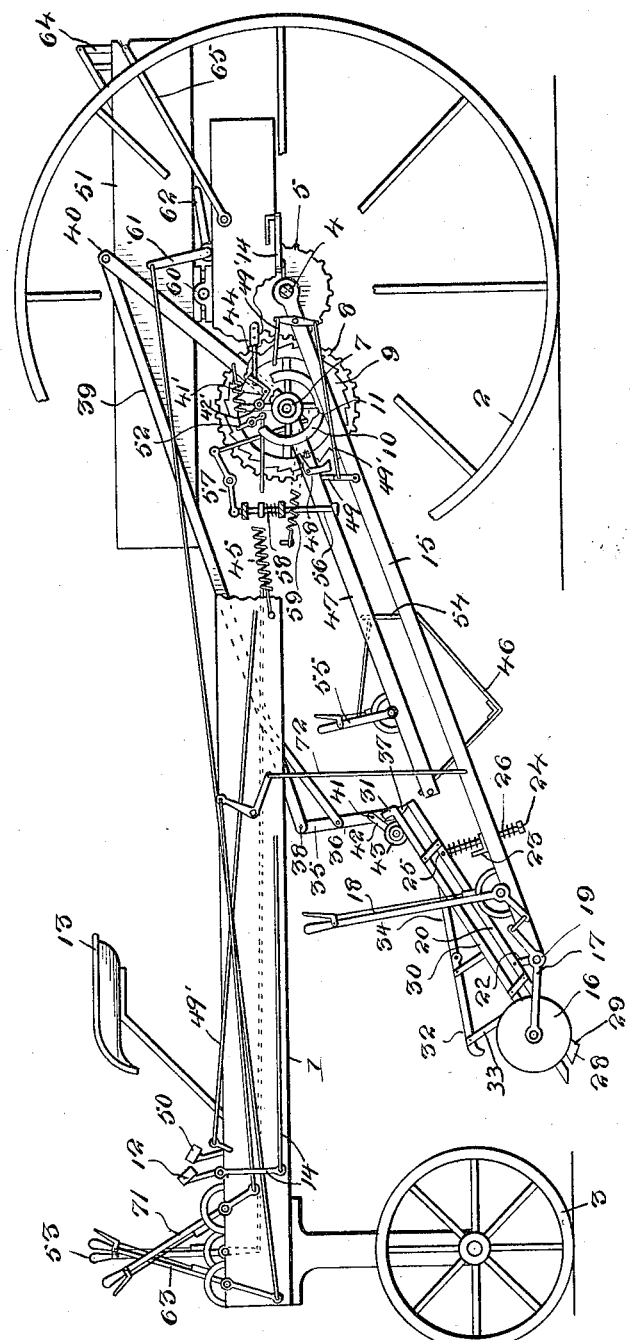

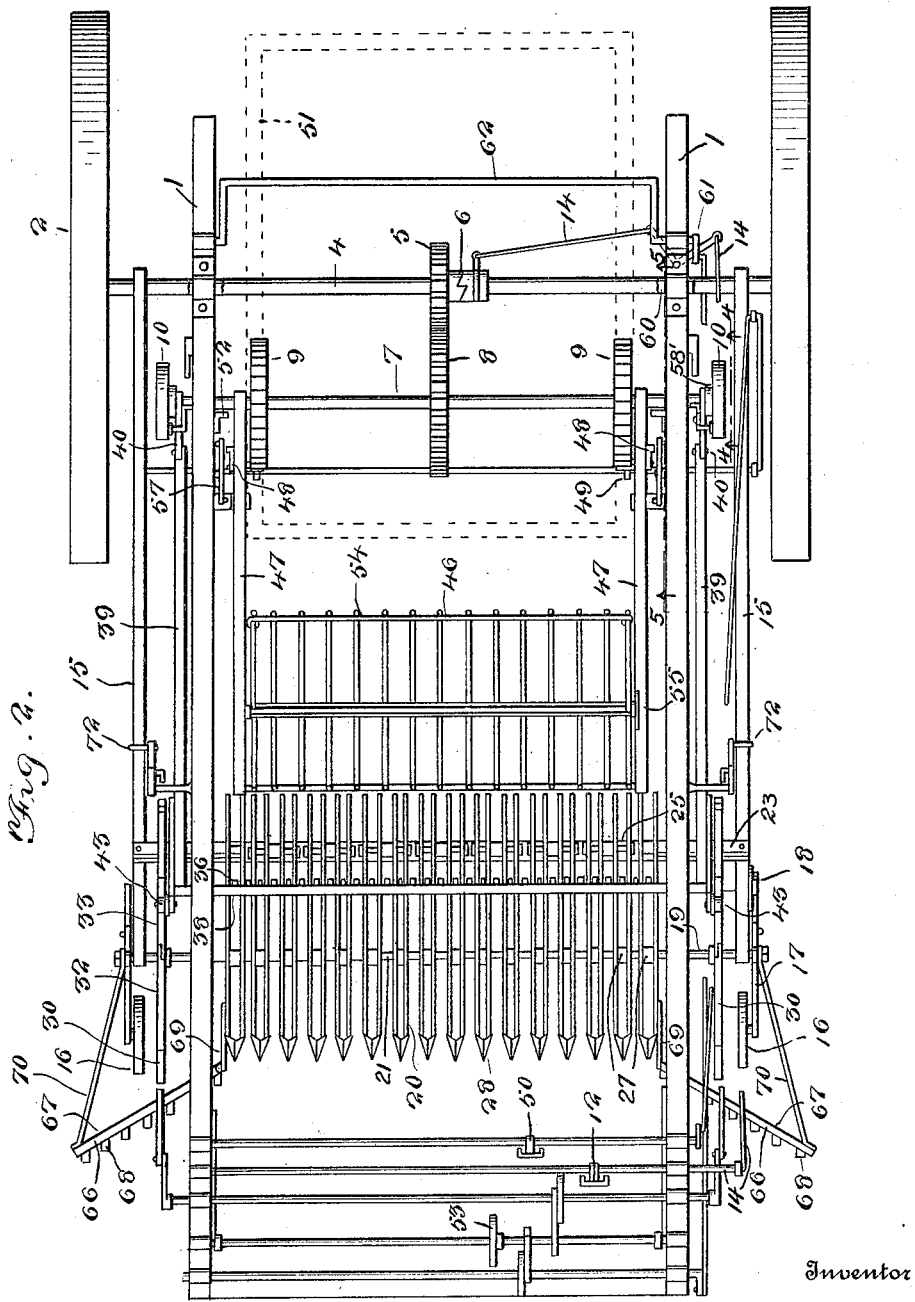

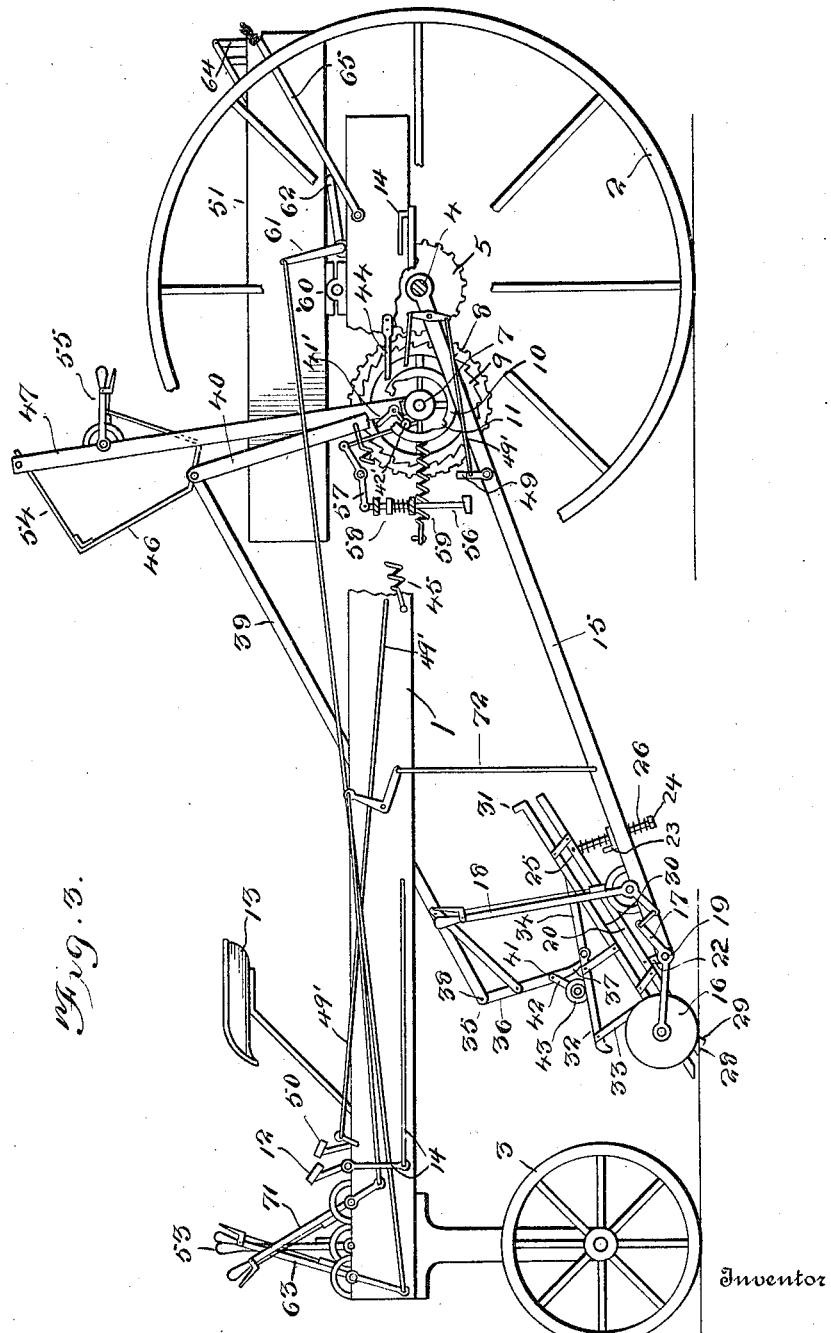

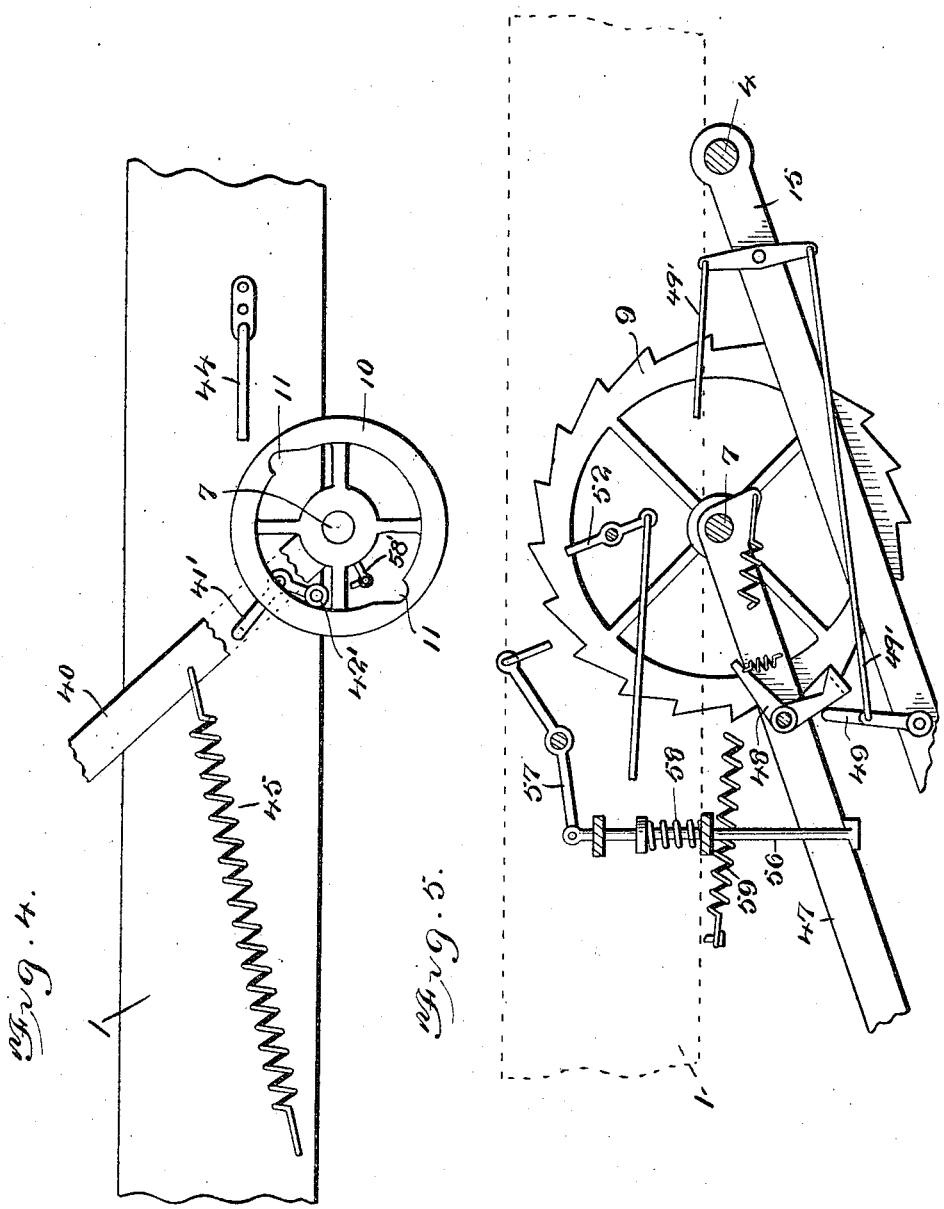

JOHN W. SCHROEDER, OF ZURICH, MONTANA.

STONE-GATHERING MACHINE.

1,305,940.

Specification of Letters Patent. Patented June 3, 1919.

Application filed October 8, 1918. Serial No. 257,374.

*To all whom it may concern:*

Be it known that I, JOHN W. SCHROEDER, a citizen of the United States, residing at Zurich, in the county of Blaine and State of Montana, have invented new and useful Improvements in Stone-Gathering Machines, of which the following is a specification.

This invention relates to improvements in stone gathering machines and the object of the invention is to provide a machine for clearing fields of stones.

Another object of the invention is to provide means for cultivating the ground and killing weeds while gathering the stones.

Among other features the invention includes a rake for forcing the stones along inclined bars, a receiving hopper for receiving the stones from the rake, means for raising the hopper when desired and a box for receiving the stones from the hopper.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.

Fig. 2 is a plan view.

Fig. 3 is a longitudinal section.

Fig. 4 is a section on the line 4—4 of Fig. 2.

Fig. 5 is a section on line 5—5 of Fig. 2.

In these views 1 indicates the frame supported by the rear wheels 2 and the front wheels 3. 4 indicates the rear axle to which the rear wheels are secured, while 5 indicates a toothed wheel loosely mounted on said axle. 6 indicates a clutch carried by the axle and adapted to engage with the toothed wheel 5 to connect the same with the axle. 7 indicates a shaft journaled in the frame and located a slight distance in advance of the axle. This shaft carries a toothed wheel 8 of greater diameter than the wheel 5 and meshing therewith.

This shaft carries a pair of toothed wheels 9 and a pair of flanged wheels 10. Each of these flanged wheels 10 is provided with a pair of diametrically arranged recesses 11 in the inner circumference of its flange. The clutch 6 is engaged and disengaged with the wheel 5 by means of a foot pedal 12 located adjacent the seat 13 and connected with the clutch by the links 14.

A pair of inclined supporting bars 15 have their upper ends loosely journaled to the shaft 4 and their lower ends are supported by wheels 16 adjustably secured to said bars by the levers 17, actuated by the hand lever 18. These bars 15 are connected together, adjacent their lower ends, by a cross bar 19.

20 indicate the plow bars which are secured together intermediate their ends by the cross bar 21 and this cross bar is connected with the bar 19 by the braces 22. 23 is an angle bar carried by the inclined bars 15 and provided with a plurality of openings through which a series of vertical rods 24 pass. The upper ends of these vertical rods are connected with the bars 20 by means of transverse rods 25 and the rods 24 each carry a pair of coil springs 26 located on each side of the angle bar so as to resiliently support the upper ends of the plow bars 20.

These plow bars are arranged in pairs with the transverse rods 25 connecting two pairs together. Each pair of plow bars is connected with the cross bar 21 by means of a bushing 27. The lower ends of each pair of plow bars have secured thereto a plow 28. This plow is of substantially triangular shape with its heel 29 slightly lower than its point so that the heel will enter the ground to a greater extent than the point.

A track bar 30 is located above and suitably connected with each of the outermost plow bars. The upper end of each of the track bars is upturned as at 31 and its lower end is inclined and extends in front of the plow. 32 indicates the upper track bars secured to the lower track bars 30 by means of the standards 33. These upper track bars are each provided with a pivoted gate 34 having its free end normally engaging the upper face of the lower track bar, due to the action of gravity.

35 indicates the rake which passes over the track bars and said rake comprises a plurality of vertically arranged rake bars 36 having their lower ends hooked as at 37 and their upper ends secured to a cross bar 38. This cross bar is carried by a pair of pitman rods 39 having their upper ends connected by links 40 with the shaft 7. The rake bars are further connected together by the transverse bar 41 and a bracket 42 secured to each of the outermost rake bars carries a roller 43 which is adapted to engage with the track bars, before described.

Each of the links 40 is provided with a dog 41' which has a roller 42' on one end engaging with the inner circumference of the flange of the wheel 10. When the wheels 10 revolve the roller 42' will engage with the recesses 11 so as to cause the links 40 to be carried around with said wheels. This movement through the pitmen 39 will cause the rake to move up the track bars 30. In this movement the rollers 43 will strike the gates 34 and lift the same so as to permit the rollers to pass by. The trips 44 are so located as to engage with the dogs 41' to release the same from the recesses 11 when the rake reaches the ends of the track bars.

Springs 45 connected with said links 40 will then draw the links and pitmen to a normal position and in this action the rake will pass downwardly and owing to the rollers 43 striking the upper surface of the gate said rake will be caused to travel over the upper bars 32. When they reach the ends of the bars 32 they will drop off on to the lower bars 30 so that the hooked ends of the rake bars will engage the pile of stones picked up by the plows and thus force said stones up the plow bars on the next upward movement of the rake.

46 indicates a hopper for receiving the stones dropping from the upper ends of the plow bars. This hopper is secured to the ends of rods 47 which have their upper ends pivoted to the shaft 7. These bars have pivoted thereto spring controlled dogs 48 which are adapted to be thrown into engagement with the toothed wheels 9 by means of levers 49 and rods 49' operated by a foot lever 50, said rods striking the dogs and throwing them into engagement with the teeth of said wheels. This will cause the said wheels to carry the bars 47 along with them and thus raise the hopper to discharge the stones therein into the box 51. The hopper is released from the wheels 9 by means of an adjustable trip 52 which is suitably connected with the lever 53. This trip is in the form of a bell crank lever so that by adjusting its position the dogs 48 will be released at different points so as to control the discharging position of the hopper. The discharge of the hopper is further controlled by a gate 54 pivoted to the upper edge of the discharge side of the hopper. This gate is controlled by a lever 55 suitably connected to said gate.

I provide means for stopping the movement of the rake while the hopper is being moved and such means comprise a rod 56 slidably supported in a part of the frame and having its lower end hooked, said hook being engaged by the bar 47 when the hopper is in its lowest position. This rod is connected with a lever 57 pivoted intermediate its ends to the frame and having one end connected with a clutch 58' in such a manner that when the rod 56 is raised by a spring 58 thereon said clutch will be disengaged from the wheel 10 so as to disconnect said wheel from the shaft. In this way as soon as the bars 47 are raised the spring 58 will raise the rod 56 and thus cause the lever 57 to throw the clutch out of engagement with the wheel and thus stop the movement of the rake. When the hopper is returned to normal position the clutch is automatically thrown into engagement with the wheel and the rake put into operation.

59 indicate springs for easing the hopper into its receiving or normal position.

The box 51 is pivoted intermediate its ends by a rod 60 and this rod is so arranged that the box will tend to assume a tilted position by gravity. The box is held in horizontal position by means of the bell crank lever 61, provided with a rod 62 which passes under the box and this lever is controlled by a hand lever 63 which is suitably connected to said bell crank lever. The end gate 64 of the box is controlled by a rod 65 so arranged that the gate will be opened when the box is tilted.

I prefer to use extension wings 66 on each side of the plow beams for gathering the stones on each side of the bars or beams. These wings consist of an L-shaped bar 67 carrying the hooks 68. This bar is hinged to a bracket 69 which is secured to one of the plow bars. 70 indicates a brace for holding each of said wings in position.

71 indicates a lever connected with the lower end of the gathering device by a connection 72 whereby said device may be lifted out of engagement with the ground, if desired.

The machine is adapted to be drawn by horses or by a tractor and it will be seen that when the plows are drawn through the ground to lift the stones therefrom the top soil will be agitated so as to kill the weeds and provide a dust mulch for holding the moisture in the ground. The rake will force the stones up the plow beams and into the hopper. When the hopper is full it may be dumped as before described into the box. By adjusting the gate 54 and the position of the trigger 52 the box may be evenly filled with the stones. After the box is filled the beams 15 with the parts carried thereby may be raised and the entire machine taken to a place where the stones may be dumped from the box.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A stone gathering machine comprising gathering means, a hopper, a rake for moving the stones from the gathering means to the hopper, a box and means for moving the hopper to dumping position over the box.

2. A stone gathering machine comprising plow means, a hopper, a rake, means for moving the rake over the plow means for carrying the stones from said means to the hopper, means for moving the hopper into dumping position, and means for throwing the rake into inoperative position while the hopper is being moved.

3. A stone gathering machine comprising a frame, wheels supporting the same, a box on said frame, inclined bars movably supported on the frame, adjustable rollers at the lower end of said bars, plow bars carried by said bars, a hopper located at the ends of said plow bars, a rake, means for moving the rake over the plow bars to carry the stones therefrom to the hopper, means for moving the hopper into dumping position over the box and means for stopping the movement of the rake on the movement of the hopper.

4. A stone gathering machine comprising a wheeled frame, inclined bars supported thereby, plow bars carried by said inclined bars, upper and lower track bars located over said plow bars, a pivoted gate carried by the upper track bar and engaging with the lower track bars, a rake, rollers carried thereby engaging with the track bars, means for moving the rake and means for moving the hopper into dumping position.

5. A stone gathering machine comprising a wheeled frame, elevator means connected therewith, a hopper for receiving the stones from said means, a box, means for moving the hopper to dumping position over the box and means for adjusting the dumping position of the hopper.

6. A stone gathering machine comprising a wheeled frame, inclined bars carried thereby, plow bars carried by said inclined bars, plow points at the ends of said plow bars, the heel of each plow extending to a greater depth than the point thereof and means for adjusting the depth the plows will enter the ground.

7. A stone gathering machine comprising a wheeled frame, a pair of inclined bars secured thereto, plow means carried by said bars, elevator means located adjacent said plow means, wings projecting from each of said bars and hook members carried by said wings.

In testimony whereof I affix my signature.

JOHN W. SCHROEDER.

Copies of this patent may be obtained for five cents each, by addressing the "Commissioner of Patents, Washington, D. C."